(12) United States Patent
Hattori

(10) Patent No.: US 11,604,281 B2
(45) Date of Patent: Mar. 14, 2023

(54) POSITION AND POSTURE ESTIMATION APPARATUS OF A FORKLIFT PALLET

(71) Applicant: KABUSHIKI KAISHA TOYOTA JIDOSHOKKI, Kariya (JP)

(72) Inventor: Shingo Hattori, Kariya (JP)

(73) Assignee: KABUSHIKI KAISHA TOYOTA JIDOSHOKKI, Kariya (JP)

(*) Notice: Subject to any disclaimer, the term of this patent is extended or adjusted under 35 U.S.C. 154(b) by 126 days.

(21) Appl. No.: 16/985,638

(22) Filed: Aug. 5, 2020

(65) Prior Publication Data
US 2021/0041564 A1 Feb. 11, 2021

(30) Foreign Application Priority Data

Aug. 8, 2019 (JP) .............................. JP2019-146591

(51) Int. Cl.
G01S 17/42 (2006.01)
B66F 9/075 (2006.01)

(52) U.S. Cl.
CPC ............ G01S 17/42 (2013.01); B66F 9/0755 (2013.01)

(58) Field of Classification Search
CPC ........ G01S 17/42; G01S 17/875; G01S 17/88; G01S 17/08; B66F 9/0755
See application file for complete search history.

(56) References Cited

U.S. PATENT DOCUMENTS

| 4,864,147 A | * | 9/1989 | Ikari | ...................... G01S 7/4813 356/3.04 |
| 2016/0075542 A1 | * | 3/2016 | Buchmann | ............ B66F 17/003 414/667 |
| 2017/0285644 A1 | | 10/2017 | Ichinose et al. | |
| 2020/0377350 A1 | * | 12/2020 | Nonogaki | ............... B66F 9/063 |

FOREIGN PATENT DOCUMENTS

| JP | H05186200 A | * | 7/1993 |
| JP | 2017-178567 A | | 10/2017 |

* cited by examiner

Primary Examiner — Hwa Andrew Lee
(74) Attorney, Agent, or Firm — Sughrue Mion, PLLC

(57) ABSTRACT

A position and posture estimation apparatus includes: a laser sensor configured to be disposed on at least one of left and right sides of a forklift, to emit laser light to a side surface of a pallet lifted by a fork, and to receive reflected light of the laser light and acquire a laser measurement point group; and an estimation calculation unit configured to estimate a position and a posture of the pallet with respect to the fork based on the laser measurement point group acquired by the laser sensor.

3 Claims, 4 Drawing Sheets

US 11,604,281 B2

POSITION AND POSTURE ESTIMATION APPARATUS OF A FORKLIFT PALLET

TECHNICAL FIELD

The present disclosure relates to a position and posture estimation apparatus.

BACKGROUND

For example, a technology disclosed in Japanese Unexamined Patent Publication No. 2017-178567 is known as a position and posture estimation apparatus in the related art. The position and posture estimation apparatus described in Japanese Unexamined Patent Publication No.-2017-178567 obtains distance data using a 3D scanner that emits laser light and measures a distance to a peripheral object using reflected light of the emitted laser light. Then, the position and posture estimation apparatus performs a coordinate transformation on the distance data to an observation point group in a three-dimensional space, and specifies a position and a posture of the pallet disposed in front of a forklift based on the observation point group.

However, the position and posture estimation apparatus described above discloses a technology far estimating the position and the posture of the pallet disposed in front of the forklift before lifting the pallet by a fork of the forklift. In this position and posture estimation apparatus, it is not assumed that the position and the posture of the pallet are estimated in a state in which the pallet is lifted by the fork. Furthermore, in this position and posture estimation apparatus, since the 3D scanner is attached to the fork, in the state in which the pallet is lifted by the fork, it is difficult to estimate the position and the posture of the pallet with respect to the fork based on the measurement values measured by the 3D scanner.

The present disclosure provides a position and posture estimation apparatus that can estimate a position and a posture of a pallet with respect to a fork in a state in which the pallet is lifted by a fork.

SUMMARY

According to an aspect of the present disclosure, a position and posture estimation apparatus estimates a position and a posture of a pallet lifted by a fork of a forklift. The apparatus includes: a laser sensor disposed on at least one of left and right sides of the forklift, and configured to emit laser light to a side surface of the pallet lifted by the fork, and receive reflected light of the laser light to acquire a laser measurement point group; and an estimation calculation unit configured to estimate the position and the posture of the pallet with respect to the fork based on the laser measurement point group acquired by the laser sensor.

DETAILED DESCRIPTION

Hereinafter, embodiments of the present disclosure will be described in detail with reference to the drawings.

Figure 1:
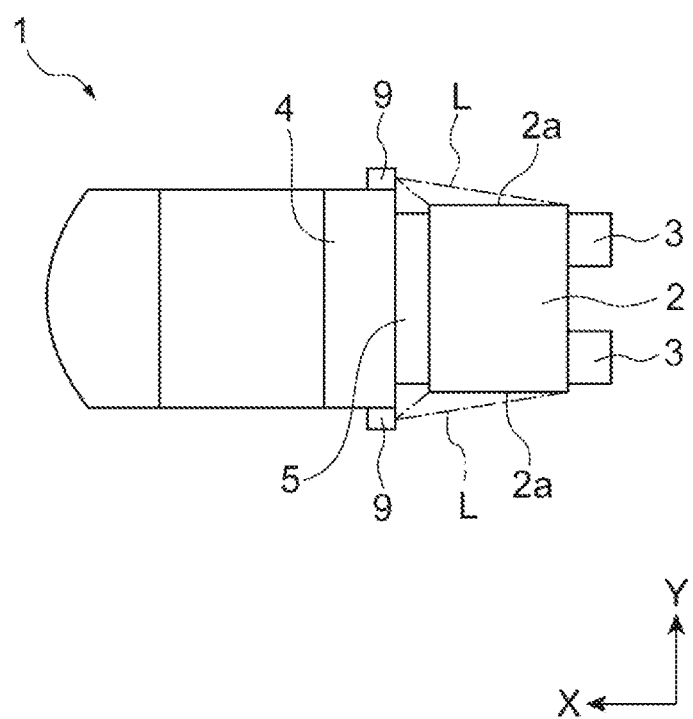
FIG. 1 is a schematic plan view illustrating a forklift to which a position and posture estimation apparatus according to an embodiment of the present disclosure is applied.

FIG. 1 is a schematic plan view illustrating a forklift to which a position and posture estimation apparatus according to an embodiment of the present disclosure is applied. In FIG. 1, a forklift 1 includes a pair of forks 3 for lifting a pallet 2. The fork 3 is attached to a mast 4 via a lift bracket 5 to be able to move up and down.

Luggage is placed on the pallet 2. Examples of types of the pallet 2 include a flat pallet, a box pallet, and a sheet pallet. The pallet 2 may be a box-type mesh pallet.

Figure 2:
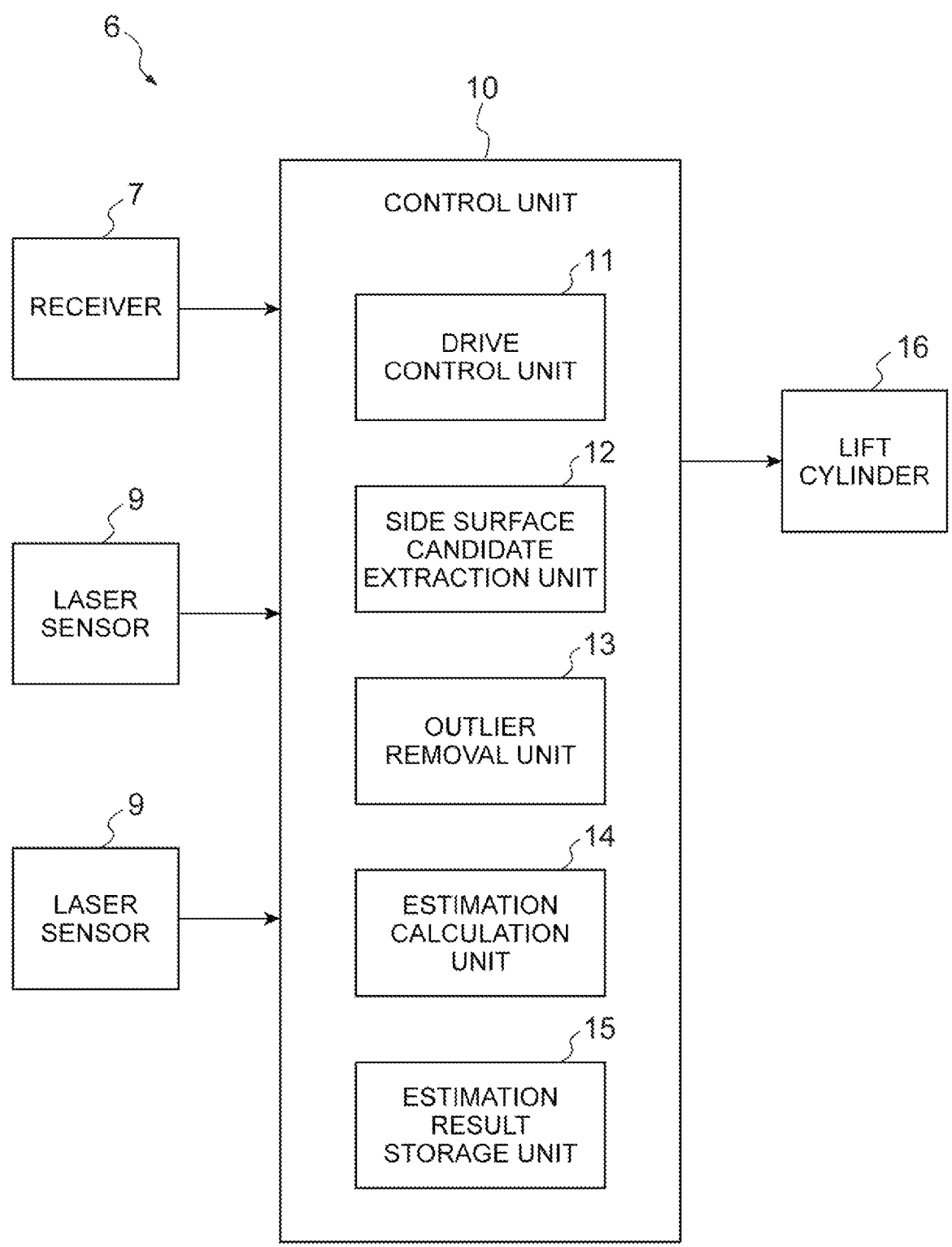
FIG. 2 is a block diagram illustrating a configuration of the position and posture estimation apparatus according to the embodiment of the present disclosure.

FIG. 2 is a block diagram illustrating a configuration of the position and posture estimation apparatus according to an embodiment of the present disclosure. In FIG. 2, a position and posture estimation apparatus 6 in the present embodiment estimates a position and a posture of the pallet 2 lifted by the fork 3 when an automatic operation is performed on the forklift 1. The automatic operation of the forklift 1 is managed by, for example, a management apparatus of a host system.

The position and posture estimation apparatus 6 includes a receiver 7, two laser sensors 9, and a control unit 10. The position and posture estimation apparatus 6 is mounted on the forklift 1.

The receiver 7 receives information from the host system. The information from the host system includes, for example, instruction information. The instruction information is one of information transmitted from the host system to the forklift 1. The instruction information is information for the instruction by the host system to start estimating the position and the posture of the pallet 2 after it is confirmed that the pallet 2 is loaded on the fork 3. When it is detected that the pallet 2 is loaded on the fork 3, the instruction information may be issued in the control unit 10.

The laser sensors 9 are arranged on both the left and right sides of the forklift 1 as illustrated in FIG. 1. For example, a laser sensor for detecting an obstacle is used as the laser sensor 9. The laser sensor 9 is attached to, for example, a mast 4 or a backrest fixed to the lift bracket 5.

The laser sensor 9 emits laser L on the side surfaces 2a of the pallet 2 lifted by the fork 3, and receives the reflected light of the laser L to acquire a laser measurement point group. Then, the laser sensor 9 measures the distance to the side surfaces 2a of the pallet 2. The laser sensor 9 emits the laser L in a two-dimensional direction (i.e., XY direction). The measurement range of the laser sensor 9 is, for example, 270 degrees. The laser measurement point group includes a plurality of laser measurement points (refer to FIG. 4).

The side surfaces 2a of the pallet 2 are surfaces of the pallet 2 perpendicular to the lateral direction of the forklift 1 (i.e., the Y direction). The distance between the two left and right laser sensors 9 is longer than a width of the pallet 2 (i.e., a dimension in the Y direction). When the pallet 2 is a mesh pallet, the side surfaces 2a of the pallet 2 are formed of a wall portion excluding the mesh.

The control unit 10 is configured to include a CPU, a RAM, a ROM, an input/output interface, and the like. When the instruction information from the host system is received by the receiver 7, the control unit 10 estimates the position and the posture of the pallet 2 with respect to the fork 3 based on the measurement signal of the laser sensor 9.

The control unit 10 includes a drive control unit 11, a side surface candidate extraction unit 12, an outlier removal unit 13, an estimation calculation unit 14, and an estimation result storage unit 15.

The drive control unit 11 controls a lift cylinder 16 so that the pallet 2 lifted by the fork 3 moves up and down to a height position corresponding to a height position of the laser sensor 9. The lift cylinder 16 is, for example, a hydraulic cylinder that moves the fork 3 up and down.

The side surface candidate extraction unit 12 extracts only the laser measurement points corresponding to the reflected light reflected from the side surface 2a of the pallet 2 as the candidate of the side surface 2a of the pallet 2 in the laser measurement point group acquired by the laser sensors 9. The processing for extracting only the laser measurement points corresponding to the light reflected from the side surface 2a of the pallet 2 will be described later in detail.

The outlier removal unit 13 removes outliers in the laser measurement point group acquired by the laser sensor 9. At this time, the outlier removal unit 13 removes the outliers in the laser measurement points extracted by the side surface candidate extraction unit 12. The processing for removing such outliers will be described later in detail.

The estimation calculation unit 14 calculates a function representing a relationship between the laser measurement points in the laser measurement point group based on the laser measurement point group acquired by the laser sensor 9, and estimates the position and the posture of the pallet 2 with respect to the fork 3. At this time, the estimation calculation unit 14 calculates the function representing the relationship between the laser measurement points acquired by the extraction with the side surface candidate extraction unit 12 and by removing the outlier with the outlier removal unit 13. Then, the estimation calculation unit 14 estimates the position and the posture of the pallet 2 with respect to the fork 3. The processing for estimating the position and the posture of the pallet 2 will be described later in detail.

The estimation result storage unit 15 stores a result of estimation of the position and the posture of the pallet 2 obtained by the estimation calculation unit 14.

Figure 3:
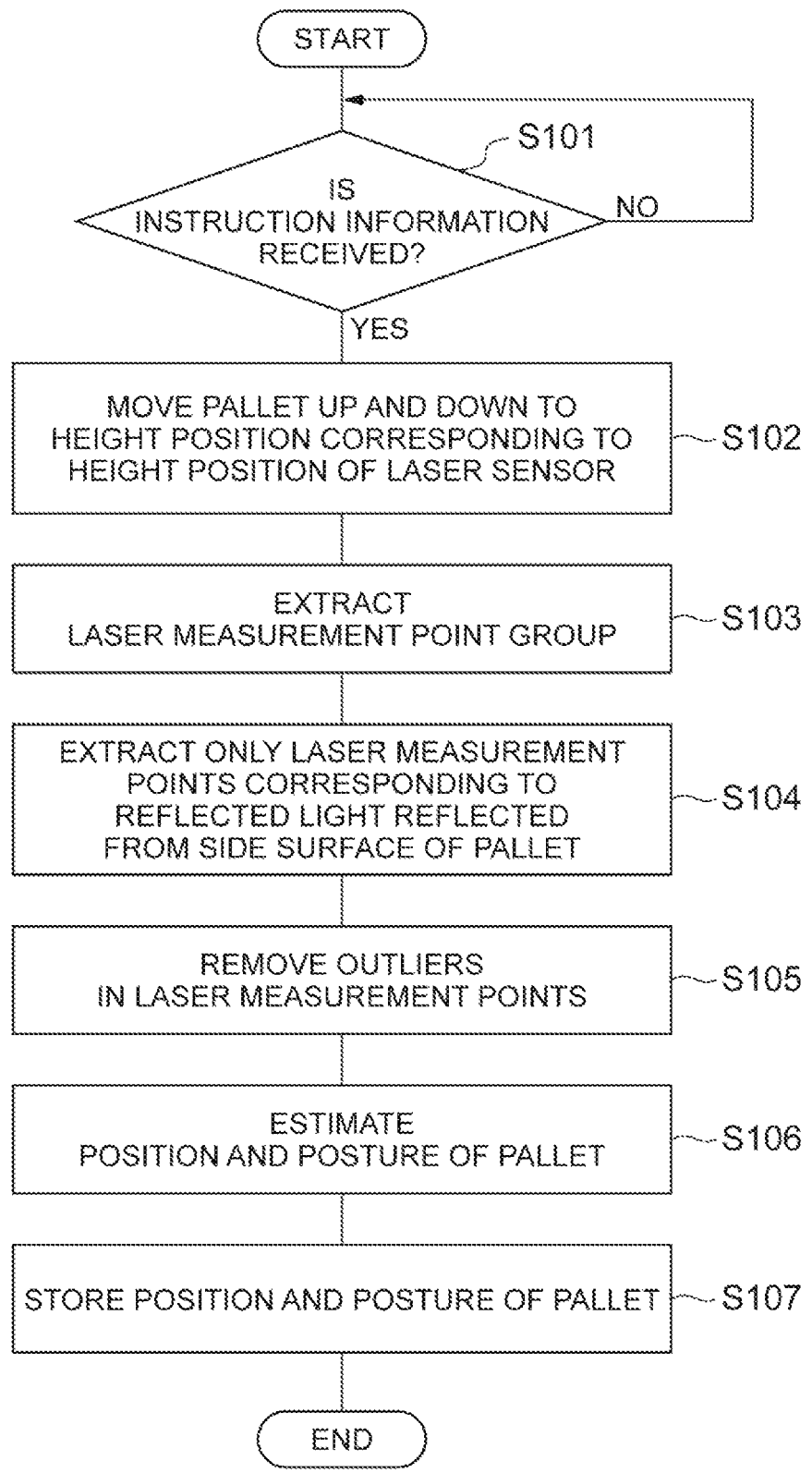
FIG. 3 is a flowchart illustrating details of an estimation processing procedure performed ley the control unit illustrated in FIG. 2.

FIG. 3 is a flowchart illustrating details of the estimation processing procedure performed by the control unit 10. In FIG. 3, first, the control unit 10 determines whether or not the instruction information from the host system is received via the receiver 7 (step S101). That is, the control unit 10 determines whether or not the instruction information instructs to start the estimation of the position and the posture of the pallet 2.

When it is determined that the instruction information is received, the control unit 10 controls the lift cylinder 16 such that the pallet 2 lifted by the fork 3 moves up and down to the height position corresponding to the height position of the laser sensor 9 (step S102). The height position of the pallet 2 corresponding to the height position of the laser sensor 9 includes a slight difference from the height position of the laser sensor 9 due to a design error or the like. In this way, the height of the pallet 2 becomes substantially equal to the height of the laser sensor 9.

Figure 4:
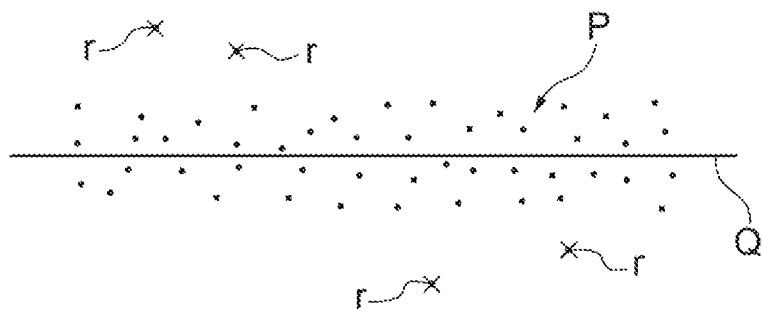
FIG. 4 is an image diagram illustrating an example of laser measurement points corresponding to light reflected from a side surface of a pallet.

Subsequently, the control unit 10 extracts the laser measurement point group acquired by the laser sensor 9 (step S103). Then, as illustrated in FIG. 4, the control unit 10 extracts only the laser measurement points P corresponding to the reflected light reflected from the side surface 2a of the pallet 2 in the laser measurement point group extracted in step S103 (Step S104).

At this time, in the laser measurement point corresponding to the reflected light reflected from the side surface 2a of the pallet 2 and the laser measurement point corresponding to the reflected light reflected from a portion other than the side surface 2a of the pallet 2, the distances from the laser sensor 9 to the reflection position are different from each other. Therefore, the control unit 10 can easily extract only the laser measurement points P corresponding to the reflected light reflected from the side surface 2a of the pallet 2.

In particular, if the pallet 2 is a mesh pallet, a part of the laser emitted from the laser sensor 9 passes through the mesh of the mesh pallet, the laser measurement points acquired by the laser sensor 9 tend to vary. Depending on the size of the mesh of the mesh pallet or the direction of emission by the laser sensor 9, the number of laser measurement points obtained by the laser light reflected from the side surface of the mesh pallet are extremely small compared to the number of laser measurement points obtained by the laser light passing through the mesh of mesh pallet and reflected from the portion other than the side surface of the mesh pallet.

By performing the present processing procedure, the laser measurement points obtained by the laser light passing through the mesh of mesh pallet and reflected from the portion other than the side surface of the pallet are removed, and the laser measurement points obtained by the laser light reflected from the side surface of the mesh pallet remain.

Subsequently, as illustrated in FIG. 4, the control unit 10 removes the outliers r in the laser measurement points P extracted in step S104 (step S105). The outlier r is a value greatly deviating from other laser measurement points. The outlier r tends to come out due to rain or dusts. When the pallet 2 is a mesh pallet, the outliers r are likely to appear.

The test for assuring the outlier r is performed using, for example, the average value and the standard deviation. Specifically, if it is assumed that the laser measurement points follow a normal distribution, the values that is deviated from the average value approximately equal to or more than $2\sigma$ to $3\sigma$ ($\sigma$ is a standard deviation) is regarded as the outlier r.

Subsequently, the control unit 10 estimates the position and the posture of the pallet 2 with respect to the fork 3 based on the laser measurement points P from which the outlier r has been removed in step S105 (step S106). As illustrated in FIG. 4, the control unit 10 calculates a function Q representing the relationship between the laser measurement points P from which the outlier r has been removed, using the least square method or the like. Then, the control unit 10 estimates the position and the posture of the pallet 2 with respect to the fork 3. The function Q representing the relationship between the laser measurement points P is, for example, a linear function (i.e., a regression line).

The least square method is a known method for obtaining the most probable regression line by minimizing the sum of the squares of the error in the processing of the measurement values with errors (here, the laser measurement points). The regression line is represented by the average value, the covariance, the standard deviation, and the like.

Subsequently, the control unit 10 stores the position and the posture of the pallet 2 estimated in step S106 (step S107).

Here, the drive control unit 11 performs steps S101 and S102. The side surface candidate extraction unit 12 performs steps S103 and S104. The outlier removal unit 13 performs step S105. The estimation calculation unit 14 performs step S106. The estimation result storage unit 15 performs step S107.

By such processing, a loading state of the pallet 2 with respect to the fork 3 can be recognized. If there is a deviation in the position and the posture of the pallet 2 with respect to the fork 3, the position and the posture of the pallet 2 are adjusted based on the information in the estimation result storage unit 15 when placing the luggage on the pallet 2.

When the forklift 1 includes a side shift cylinder that shifts the fork 3 to the left and right sides, the position and the posture of the pallet 2 with respect to the fork 3 may be corrected by controlling the drive of the side shift cylinder.

Incidentally, if the laser light from the laser sensor 9 is emitted to the upper surface of the pallet 2, in some cases, the pallet 2 may not be detected by the laser sensor 9 when the luggage is placed on the pallet 2. In this case, the position and the posture of the pallet 2 with respect to the fork 3 cannot be estimated.

In order to cope with such a problem, in the present embodiment, the laser light is emitted to the side surfaces 2a of the pallet 2 from the laser sensors 9 attached to the left and right sides of the forklift 1 in a state in which the pallet 2 is lifted by the fork 3 of the forklift 1, and the reflected light of the laser light is received by the laser sensor 9, and then, the laser measurement point group is acquired. Then, the position and the posture of the pallet 2 with respect to the fork 3 is estimated based on the laser measurement point group. At this time, since the laser light is emitted to the side surfaces 2a of the pallet 2, the laser sensor 9 detects the state of the side surfaces 2a of the pallet 2 regardless of the presence or absence of the luggage on the pallet 2. As a result, the position and the posture of the pallet 2 with respect to the fork 3 can be estimated while the pallet 2 is lifted by the fork 3.

In the present embodiment, the position and the posture of the pallet 2 with respect to the fork 3 can be easily estimated by calculating the function representing the relationship between the laser measurement points in the laser measurement point group using the least square method or the like.

In the present embodiment, the side surface 2a of the pallet 2 is accurately detected by removing the outliers in the laser measurement point group. Therefore, the position and the posture of the pallet 2 with respect to fork 3 can be accurately estimated.

In the present embodiment, the side surface 2a of the pallet 2 is detected with higher accuracy by extracting only the laser measurement points corresponding to the reflected light reflected from the side surface 2a of the pallet 2. Therefore, the position and the posture of pallet 2 with respect to fork 3 can be estimated more accurately.

In the present embodiment, the lift cylinder 16 is controlled such that the pallet 2 moves up and down to the height position corresponding to the height position of the laser sensor 9, Therefore, since it is not necessary to dispose the laser sensor 9 at the height position corresponding to the height position of the pallet 2 lifted by the fork 3, the freedom of design in the position for mounting the laser sensor 9 is increased, and it is possible to mount the laser sensor 9 at an easily mountable place.

The present disclosure is not limited to the embodiment described above. For example, in the embodiment described above, the position and the posture of the pallet 2 with respect to the fork 3 are estimated by calculating the function representing the relationship between the laser measurement points using the least square method or the like, but the method is not limited thereto. For example, the position and the posture of the pallet 2 with respect to the fork 3 are estimated by calculating a function representing the relationship between the laser measurement points using a robust estimation method such as a random sample consensus (RANSAC). The robust estimation is a technology for the purpose of suppressing the influence of the outliers included in the measurement value (here, the laser measurement points). In this case, the outlier removal unit 13 that removes the outliers in the laser measurement point group may not be provided.

In the above embodiment, only the laser measurement points corresponding to the reflected light reflected from the side surface 2a of the pallet 2 is extracted from the laser measurement point group acquired by the laser sensor 9, by the side surface candidate extraction unit 12. However, when a mesh pallet is not used as the pallet 2, such a side surface candidate extraction unit 12 may not be provided.

In the embodiment described above, the laser sensors 9 are disposed on both the left and right sides of the forklift 1, but not particularly limited thereto. The laser sensor 9 may be disposed on only one side of the left and right sides of the forklift 1. That is, the laser sensor 9 may be disposed on at least one side of the left and right sides of the forklift 1.

In the embodiment described above, the lift cylinder 16 is controlled such that the pallet 2 moves up and down to the height position corresponding to the height position of the laser sensor 9. However, when the laser sensor 9 is disposed at the height position corresponding to the height position of the pallet 2, such drive control of the lift cylinder 16 is not necessary.

What is claimed is:

1. A position and posture estimation apparatus that estimates a position and a posture of a pallet lifted by a fork of a forklift, comprising:
   a first laser sensor disposed on a left side of the forklift and a second laser sensor disposed on a right side of the forklift, which emit laser light in a direction that is angled inward toward each of a left side surface and a right side surface of the pallet lifted by the fork, and receive reflected light of the laser light to acquire laser measurement points,
   wherein a distance between the first laser sensor and the second laser sensor disposed on the left side and the right side of the forklift is longer than a distance between the left side surface and the right side surface of the pallet lifted by the fork;
   wherein each of the left side surface and the right side surface of the pallet, which receive the emitted laser light from the first and second laser sensors, is an outer side surface which forms an outer contour of the pallet; and
   a processor, and a memory that stores a program that is executed by the processor, wherein the processor is programmed to:
   extract only the laser measurement points corresponding to the reflected light reflected from the right side surface and the left side surface of the pallet to acquire a laser measurement point group,
   remove outliers in the laser measurement point group, wherein the outliers are laser measurement points in the laser measurement point group which deviate from an average value of the extracted laser measurement points by at least two standard deviations,
   estimate the position and the posture of the pallet with respect to the fork based on the laser measurement point group from which the outliers have been removed.

2. The position and posture estimation apparatus according to claim 1,
   wherein processor is further programmed to calculate a function representing a relationship between the extracted laser measurement points in the laser measurement point group from which the outliers have been removed.

3. The position and posture estimation apparatus according to claim 1, wherein the processor is further programmed to:

control a lift cylinder that moves the fork up and down, wherein the lift cylinder is controlled such that the pallet moves up and down to a height position corresponding to a height position of the first and second laser sensors.

* * * * *